Nov. 4, 1952  R. J. KNOTH  2,616,720
WHEELED ATTACHMENT FOR HAND TRUCKS
Filed Dec. 19, 1949  2 SHEETS—SHEET 1
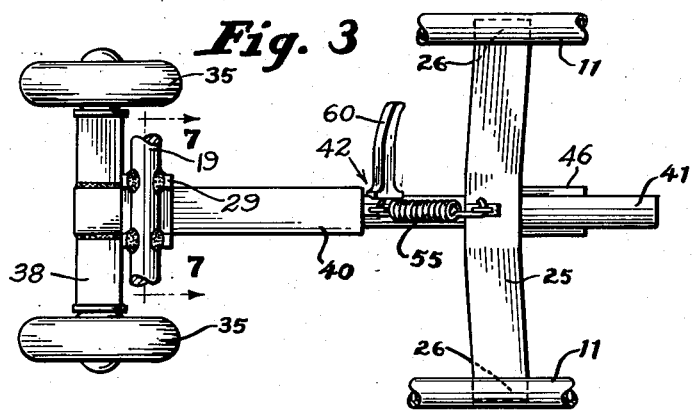
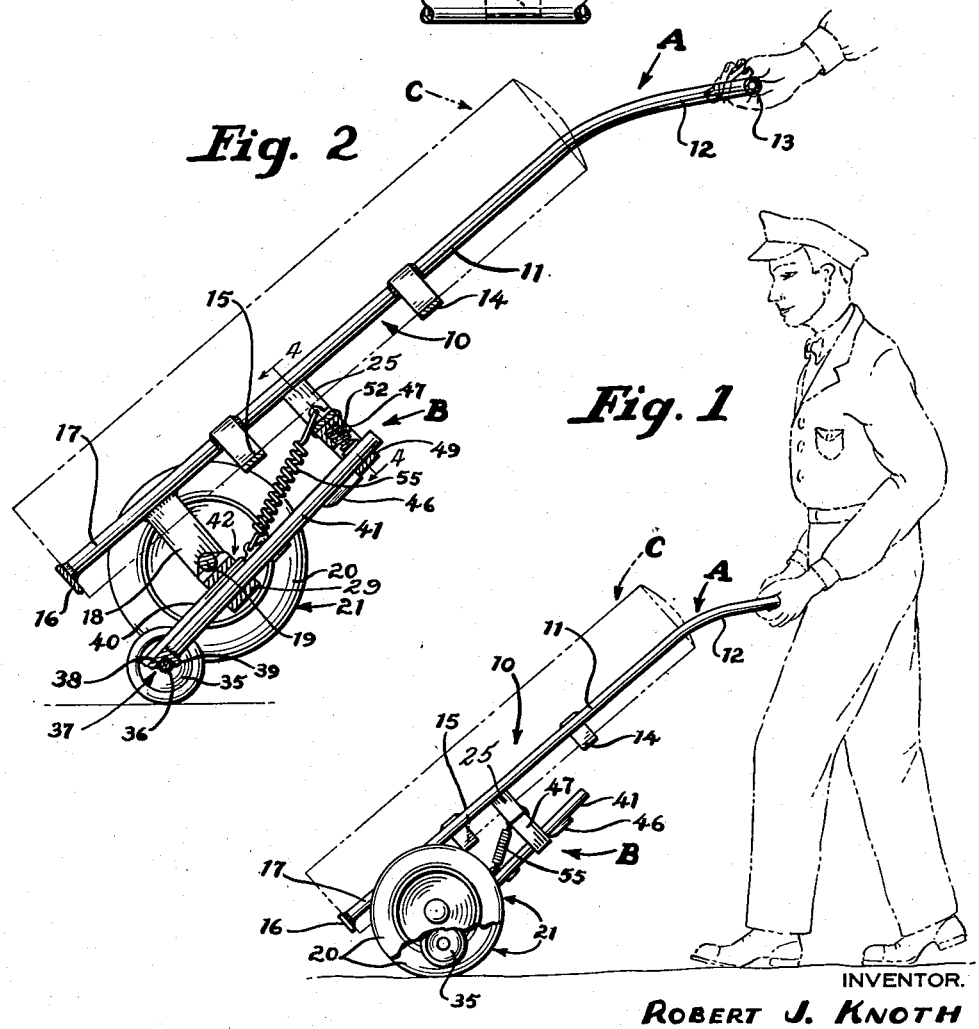
INVENTOR.
ROBERT J. KNOTH
BY
ATTORNEYS.

Nov. 4, 1952
R. J. KNOTH
2,616,720
WHEELED ATTACHMENT FOR HAND TRUCKS
Filed Dec. 19, 1949
2 SHEETS—SHEET 2
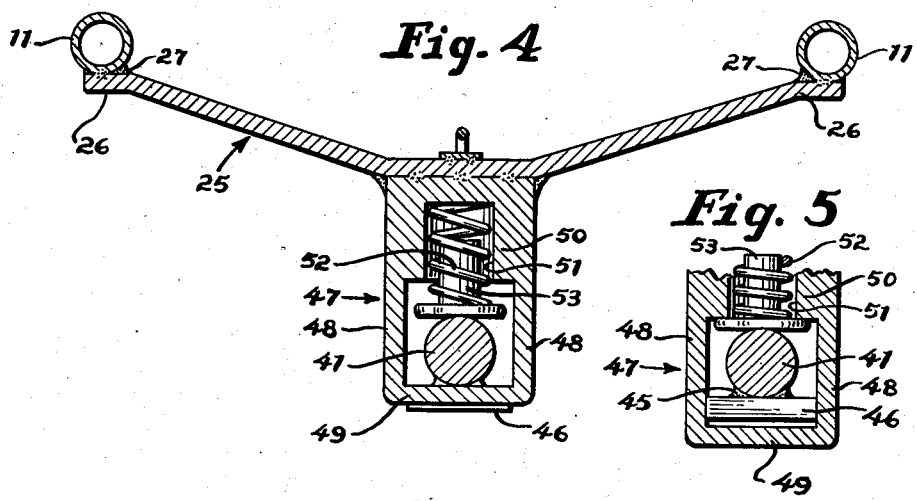
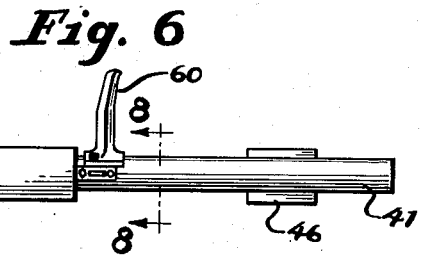
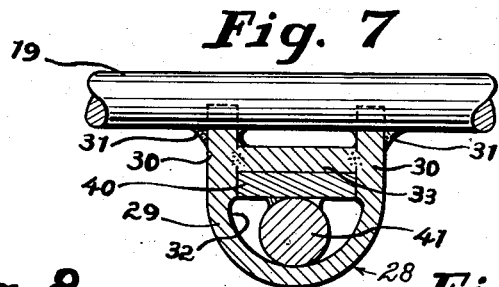
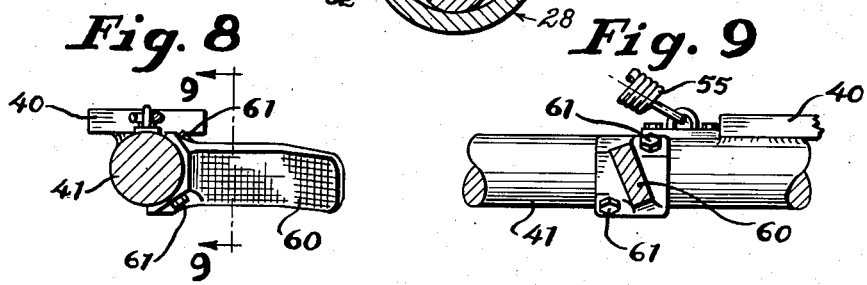
INVENTOR.
ROBERT J. KNOTH
BY
ATTORNEYS.

Patented Nov. 4, 1952

2,616,720

UNITED STATES PATENT OFFICE 2,616,720

WHEELED ATTACHMENT FOR HAND TRUCKS

Robert J. Knoth, Jeffersonville, Ind.

Application December 19, 1949, Serial No. 133,842

1 Claim. (Cl. 280—43)

This invention relates to wheeled vehicles of the hand truck types, but provided with additional wheel attachments.

In many situations, in the use of hand trucks, it is very desirable that the ground wheels thereof be elevated and the truck travels on auxiliary wheels. Such situations are, for example, when the ground wheels become muddied and it is necessary for the truck to thereafter travel over carpets, rugs and the like, or where the ground wheels are corrugated and the truck must travel over such floor coverings or the floor itself and the corrugations would be apt to cause damage. A specific situation is where such a hand truck is employed to truck a water-softening material-containing cylinder from a service truck to the location the cylinder occupies in a dwelling when in use. That is, the operator of the hand truck need frequently roll the laden truck over wet or muddy ground, then into the dwelling, over floors, carpets and rugs to the site of the water-softening apparatus and return the hand truck to the service truck.

An important object of the invention is to provide a wheel attachment for conventional hand trucks which is carried by the truck and comes into use to elevate the truck body and ground wheels above the surface of travel and permit travel of the truck on the auxiliary wheels as long as required, whereupon the truck body and ground wheels are lowered to the surface of travel and the auxiliary wheels raised above that surface.

Another important object is to provide an attachment as described which is manipulated by the foot of the operator whereby his hands are free to hold the truck. This is especially important where the truck is a conventional two-wheeled one and is heavy laden, with the truck handles remote from the ground wheels and separated therefrom by a cradle for the device being trucked.

A further important object is to provide a wheeled attachment as described having an easily-operated but positive means to latch the attachment in its operative position and spring-urged means to return it to an inoperative position.

Other objects of the invention are to provide a compact attachment for the purpose named, one which does not interfere with the locomotion of the operator nor have parts apt to catch in floor coverings or the operator's clothing. Still further objects will be apparent during the course of the following detailed description of the invention, taken in connection with the accompanying drawings, forming a portion of this disclosure, and in which drawings:

Fig. 1 is a side elevation of the new attachment, mounted upon a two-wheeled truck and in an inoperative position.

Fig. 2 is a vertical longitudinal section thereof but on an enlarged scale and showing the auxiliary wheel attachment in an operative position.

Fig. 3 is a top plan of the attachment, removed from the truck.

Fig. 4 is an enlarged vertical section, transversely of the truck, substantially on the line 4—4 of Fig. 2, with a reciprocating member latching means of the attachment shown in one position.

Fig. 5 is a fragmentary vertical section of the latching means in another position.

Fig. 6 is a fragmentary elevation of the reciprocating member and a foot pedal associated therewith.

Fig. 7 is an enlarged vertical section, substantially on the line 7—7 of Fig. 3.

Fig. 8 is a section substantially on the line 8—8 of Fig. 6.

Fig. 9 is a view partly in section, substantially on the line 9—9 of Fig. 8.

In the drawings, wherein for the purpose of illustration is shown a preferred embodiment of the invention and wherein similar reference characters designate corresponding parts throughout the several views, the letter A designates a conventional two-wheeled truck; the letter B, the new wheeled attachment therefor and C a load carried by the truck A.

The truck A includes a normally inclined frame 10 which is provided with opposite, elongated side members 11, terminating at their rearward or upper end portions 12 in a handle portion 13, such as a bight continuation of the members 11, a plurality of cross members joining the side members, such as the cross members 14, 15 and 16, the first two of which are shown as bowed to provide cradles as well as braces and are spaced apart between the rearward end portions 12 and forward or lower end portions 17 of the side members 11. The cross member 16 is carried by the forward or lower end portions 17. Extending downwardly from each end portion 17, rearwardly of the member 16, is a bracket 18 which is operatively connected with a spindle 19 upon the outer ends of which are mounted ground wheels 20 having peripheries 21.

Means to attach the device B to the truck A preferably includes an added cross member 25 shown particularly in Figs. 3 and 4, intermediate the members 14 and 15 but preferably closer the member 15. The member 25 is bowed like the two others last mentioned. It may be secured at its end portions 26 by any approved means, as welds 27, to the two side members 11. This means also includes a hanger or bracket 28, shown particularly in Fig. 7, mainly made up of, preferably, a single U-shaped member 29 with its free end portions 30 secured, as by welds 31 to the spindle 19 at the longitudinal central portion of the latter, with the axis of the opening 32 defined by the member 29 and adjacent part of the spindle 19 substantially paralleling the members 11.

Furthermore, the attachment or device B includes (as parts of the walls of this opening 32 and a crosspiece 33, welded or otherwise firmly secured to the free end portions 30 so as to bridge them) a slideway means for a reciprocating member 42 to be subsequently described.

The auxiliary ground wheels 35 of the attachment B are preferably rubber tired, smaller in diameter than the wheels 20, and rotate upon a spindle 36 which is preferably fixed, intermediate its ends to a support member, comprising a section 37 of angle iron, with one-half 38 of the angle iron disposed upon the upper portion of the spindle 36 and welded thereto while the other half 39 may extend along the rearward face of the spindle and be welded thereto, although, as may be seen in Fig. 2, for example, the plane of the upper face of the first half 38 does not parallel the intermediate portions of the members 11 but converges toward their end portions 12.

Secured to the central portion of the first half 38 of the angle iron is the forward end of a substantially straight heavy strap 40 and secured at its forward end to the central portion of the other half 39 is a round, elongated rod 41 and these two may be, in turn welded to each other, with the strap 40 upon the rod 41 and the latter being longer than the strap, whereby the latter projects rearwardly the farther. Together, the strap 40 and rod 41 may constitute the reciprocating member 42 heretofore mentioned since a part of the periphery of the rod contacts the bight portion of the U-shaped member 29 to slide therealong, while the upper face of the strap 40 contacts the under face of the crosspiece 33. The construction embodied in the elements 28, 33, 36, 37, 40 and 41 provides a firm, strong assembly, able to sustain the weight of the truck A and the load C when the ground wheels 20 are not in use.

The rod 41 continues rearwardly and is slidable through a portion of a latch means, shown particularly in Figs. 4 and 5, which also slidably supports the rearward end portion of this rod, and upon the lower face of the rod is fixed, as by welding 45, a short rigid plate 46 having a forward beveled edge and a rearward straight edge while a bracket 47 fixedly depends from the under side of the cross member 25. This bracket has a pair of straight, vertically-disposed parallel portions 48 and a lower portion 49 joins the lower ends of these portions 48 and has a rearward edge adapted to be contacted by the forward beveled edge of the plate 46. However, the width of the plate 46 is slightly less than the distance between the two opposite faces of the portions 48. It will be noted that the portions 48 are relatively long and, at their upper parts, they are joined by a socketed portion 50 (which is preferably integral therewith) with the mouth of the socket 51 opening downwardly toward the portion 49. Carried in the socket 51 is an expansion spiral spring 52 adapted to normally urge a pressure member 53 against the upper face of the rod 41. The member 53 may include a cylindrical portion encircled by the lower convolutions of the spring and a disc portion at its lower end with the lower end of the spring bearing thereagainst while the lower face of the disc bears against the upper face of the rod, thus urging the rod away from the socket, as in Fig. 4. It is now apparent that, when the forward beveled edge of the plate 46 contacts the rearward edge of the portion 49, they will tend to maintain this contact due, for one thing, to the spring pressure but that when the plate 46 is raised, against the spring pressure, to clear the portion 49, the former will slide forwardly over the latter and the parts will tend to appear substantially as in Fig. 5.

Means to normally draw the rod 41 rearwardly may be a retraction spiral spring 55 with one end secured to the cross member 25 adjacent its forward edge and with the other end of this spring secured to the rod 41 forwardly of the bracket 47. This spring, when fully retracted (as in Fig. 1) will have drawn the rod rearwardly until the beveled edge of the plate 46 contacts the rearward edge of the portion 49.

Means to assist in manually moving the reciprocating member (strap 40 and rod 41) forwardly may comprise a foot pedal 60 (shown best in Figs. 8 and 9) secured, as by screws 61 to one side of the rod 41 at a convenient position for an operator (who has tipped the truck A to substantially the position shown in Fig. 1 and is grasping the handle 13) to raise his foot and press forwardly on the pedal 60. Of course, as he does so, the reciprocating member will move forwardly, carrying the wheels 35 with it until they contact the ground surface, whereupon a slight tipping of the truck will cause the wheels 20 to raise above that surface and the truck will be supported upon the wheels 35.

With this forward movement caused by the foot of the operator, the plate 46 will rise slightly to clear the rearward edge of the portion 49, then slide over the upper face of the latter and finally slide off the latter so that the plate will drop slightly due to pressure upon the rod 41 by the spring 52, whereby the rear edge of the plate 46 will engage the forward edge of the member 49 and the reciprocating member will be latched against rearward movement until the operator again contacts the pedal 60 with his foot, pulling slightly backwards and upwardly upon the handle 13 whereupon the plate 46 will clear the forward edge of the member 49, the truck body will move forwardly until the ground wheels 20 engage the ground surface and the wheels 35 will rise from that surface until the spring 55 has contracted as in Fig. 1.

It is now clear that the operator may roll the truck A upon the ground wheels 20 over one surface, as muddy ground, but with the wheels 35 raised above such surface, however when he enters a dwelling, for example, he can readily support the truck upon the wheels 35 with the wheels 20 raised a sufficient distance to clear carpets, rugs, etc. After he has discharged his load and left the dwelling he can resume use of the wheels 20.

All these manipulations of the truck may be made without the operator removing his hands from the handle 13, which characteristic is important inasmuch as the load C may be heavy and is being transported by a truck having ground wheels adjacent one end, thus throwing a considerable extent of the weight of the load upon the operator. Consequently, were it necessary for the operator to release one hand in order to place the wheeled attachment B into or out of operation, it might be found difficult to support the load.

It will be noted that the peripheries of the wheels 35 are inwardly of the plane of the peripheries 21 of the wheels 20 when the wheels 35 are raised so that they and the adjacent structure of the attachment are partly protected by the larger wheels 20.

While it is apparent that steps may be readily ascended and descended by the truck A, equipped with the attachment B, the latter is not a specific means for raising a load to enable a truck to ascend steps or a curb, nor a means to lower a truck so it may descend steps, or a curb. Obviously either set of wheels may be employed in step or curb climbing or descending.

Neither is the attachment intended for or is it intended to be employed to convert the two-wheeled truck A into a four-wheeled vehicle.

By the term "ground surface" in the claim is meant any surface upon or over which the wheels of the truck A or of the attachment B may travel.

Various changes may be made to the form of the invention herein shown and described without departing from the spirit of the invention or scope of the claim.

What is claimed is:

In a wheeled attachment for a wheeled truck having a normally inclined frame provided with a ground wheel supporting bracket adjacent the lower end of said frame, ground wheels rotatably mounted on said supporting bracket and on opposite sides of said frame and a handle adjacent the upper end of said frame, said attachment including means for securing said attachment to said frame, including a cross member secured to said frame and spaced from said handle; an auxiliary ground wheel adjacent said first-mentioned ground wheels and smaller in diameter than the diameter of said first-mentioned ground wheels; a spindle for said auxiliary ground wheel; a support member secured to said spindle; manually-operated means for selectively assisting in manually moving said auxiliary ground wheel along a substantially straight path and into one position spaced from the ground surface and disposed wholly within the space between said ground wheels, when said ground wheels are disposed with their peripheries upon the ground surface, and along a substantially straight path and into a second position with said ground wheels spaced from the ground surface and said auxiliary ground wheel having its periphery upon said ground surface and disposed partly outside the space between said ground wheels, including a bracket depending from said cross member and an elongated reciprocating member reciprocably carried by said bracket and by said supporting bracket and fixedly secured to said support member adjacent the forward end of said reciprocating member; and means for releasably retaining said manually-operated means against movement when said auxiliary ground wheel is in said second position, including a retraction spiral spring with one end secured to said cross member and its other end secured to said reciprocating member intermediate said cross member and said support member.

ROBERT J. KNOTH.

REFERENCES CITED

The following references are of record in the file of this patent:

UNITED STATES PATENTS

| Number | Name | Date |
| --- | --- | --- |
| 672,152 | Ruher | Apr. 16, 1901 |
| 878,546 | Lyon | Feb. 11, 1908 |
| 1,100,702 | Holmes | June 16, 1914 |
| 2,243,915 | Mueller | June 3, 1941 |

FOREIGN PATENTS

| Number | Country | Date |
| --- | --- | --- |
| 102,314 | Great Britain | Nov. 30, 1916 |
| 185,067 | Great Britain | Aug. 31, 1922 |
| 418,288 | Great Britain | July 20, 1933 |
| 545,825 | Great Britain | June 15, 1942 |